Feb. 19, 1935.  R. F. ONSRUD  1,991,623
LUBRICATION
Filed Sept. 13, 1933
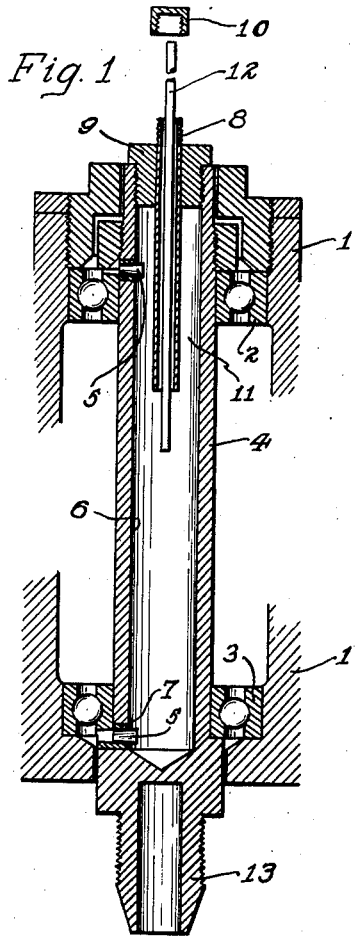
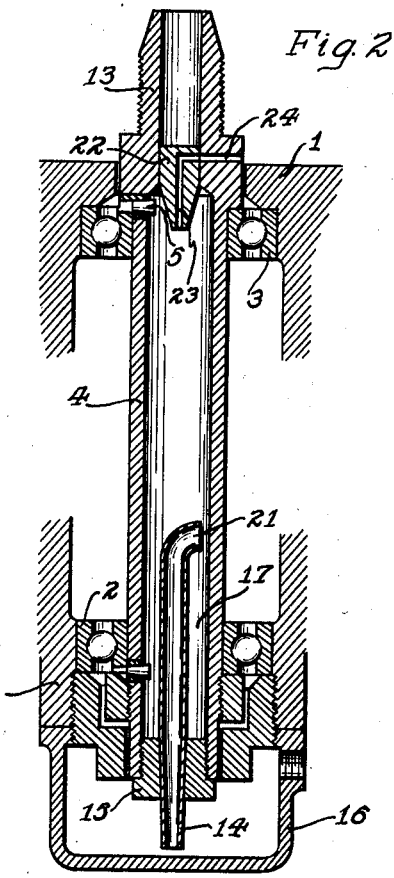
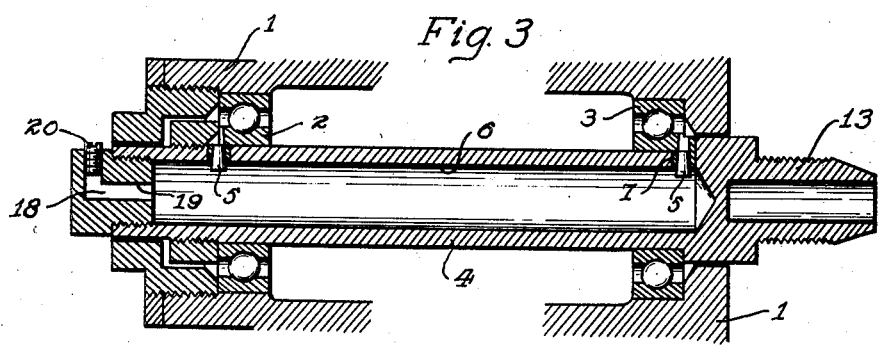
Witness:
Adolph F. Berg
Inventor
Rudolph F. Onsrud
by Rummler, Rummler & Woodworth
his Attys.

Patented Feb. 19, 1935

1,991,623

UNITED STATES PATENT OFFICE 1,991,623

LUBRICATION

Rudolph F. Onsrud, Chicago, Ill., assignor to Onsrud Machine Works, Inc., Chicago, Ill., a corporation of Illinois Application September 13, 1933, Serial No. 689,278

6 Claims. (Cl. 308—187)

This invention relates to a method and means for obtaining exactly correct lubrication, irrespective of the relative speeds of the bearing elements, and suitable for the highest speed so far attainable and practicable in mechanism.

In bearings, unless there is a total absence of rub or slip between the contacting elements of the bearing, the bearing is soon destroyed in case of insufficient lubrication, and likewise will operate with undue resistance and generate heat if over-lubricated. It is therefore desirable that the contacting surfaces of the bearing be provided with but an extremely tenuated surface coating of the lubricant. The centrifugal forces developed by rapidly rotating bearing elements may have the effect on ordinary lubricating means of discharging the lubricant too rapidly, or inducing an inordinate feed of lubricant to the bearing.

The purposes of this invention are to prevent the possibility of a bearing running dry after long continued use thereof; and to prevent an excessive supply of lubricant to the bearing; and to prevent leakage of lubricant under the high pressures used in its delivery; and to utilize the differences in pressure created by centrifugal forces for replenishing the lubricant in the supply chamber therefor.

The drawing illustrates various forms of the invention as applied to a high speed spindle rotating within surrounding bearings.

Figure 1 is a longitudinal section of a vertically arranged spindle having a tool chuck at its lower end.

Fig. 2 is a longitudinal sectional view of a vertically disposed spindle carrying a tool chuck at its upper end, and Fig. 3 is a longitudinal sectional view showing a horizontally disposed spindle.

In the illustrations, the bearing carrying frame structure may be assumed to be in fixed position, although in many cases the frame structure itself is movable so that the spindle may be disposed in any direction and the lubricating means operates in the same manner irrespective of the angular setting of the spindle or hollow shaft illustrated in the drawing.

The present invention relates to comminuting the lubricant and restricting the feed thereof when the lubricant is under pressure. The means utilized for comminuting the lubricant and restricting the delivery thereof is a plug in a passageway, which plug is apparently solid but has minute pores which will allow the passage of the lubricant when under high pressure.

In the drawing, Figure 1 shows a frame structure 1, which supports the outer races 2 and 3 of bearings for a hollow shaft 4. This shaft may be rotated at any possible speed by means not illustrated in the drawing, but is hollow so as to constitute a reservoir or feed conduit for the lubricant.

When the shaft is rotated at high speed, the lubricant therein will be spread evenly over the inner surface of the shaft, and is permitted to feed out of the shaft to the upper and lower bearings through plugs 5, which may be of wood or bone or other finely porous material. These plugs are slightly tapered and have their large inner ends projecting inwardly from the inner surface 6 of shaft 1. The plugs either fit apertures in shaft 3 or fit into a tapered sleeve 7 in apertures passing through the shaft.

The taper of the plugs prevents their being displaced outwardly due to the pressure of the lubricant on the inner ends of the plugs. The plugs are of such material that in high speed bearings a high pressure is required to force the lubricant through the plugs. In its passage therethrough the lubricant is divided into minute particles which are projected outwardly into the bearing in such an extremely tenuated mist as to be hardly sufficient to develop a perceptible stain on paper supported outside of the bearing in hours or even several days running. The pressure may be developed by the centrifugal force brought about by the high speed of the shaft. By this is meant speeds which are not common with machinery and may be between 20,000 and 60,000 R. P. M. The lubricator is designed to meet the requirements of any possible speed, but is altered according to speed and pressure conditions.

The comminuting plug may be of such density as to prohibit the passage of lubricant at low speeds, while at the pressure and speed for which it is designed it will function to provide the necessary supply of lubricant to the bearings.

Depending within the hollow shaft 4 and rotating therewith is a tube 8. This tube is supported by a bushing 9 threaded into the shaft, and a cap 10 is provided for the tube enclosing it and preventing the entrance of dust. The function of the tube through which the lubricant may be supplied to the hollow shaft is mainly to provide an air pocket in the location indicated by the numeral 11. This will prevent filling the shaft with lubricant but slightly above the lower end of the tube.

When the shaft is rotated the lubricant spreads into tubular form over the inner surface of the shaft and the air fills the core left in the lubricant, and therefore prevents the lubricant from being pressed outwardly through some such central opening as along the threads of cap 10.

The tube 8 also provides a convenient means for inserting a reed float or gauge 12 for determining the quantity of lubricant in the shaft.

Figure 2 shows the shaft 4 turned end for end so that the chuck 13 is at the upper end of the shaft. In this case a tube 14 projects into the lower end of the shaft and extends downwardly beyond the bushing 15 by means of which it is connected to the shaft. The lower end of the tube dips into a lubricant supply container 16. When the shaft comes to rest from a rotating condition the lubricant which clings in a cylindrical form to the inner surface of the shaft drops down by gravity and settles within the space 17 between the tube and the shaft. Any lubricant in excess of what would fill such space passes downwardly through the tube and back into the container 16. When the shaft is again rotated the lubricant spreads upwardly from the space 17 and the air, due to centrifugal force, becomes rarefied along the axis of the shaft and therefore causes an upward flow of lubricant from the container 16 through the tube 14 until the tubular column or film of lubricant adhering to the inner wall of the shaft is thick enough to seal the outlet 21 of tube 14. The outlet end of the tube is bent as indicated in the drawing so that the film of lubricant may seal the outlet when this film is thick enough to reach the inlet end of the plugs 5.

The rarefaction of the central core of air in the hollow shaft may be increased and maintained to the desired degree by means of an air passageway in a plug 22 at the upper end of the shaft and a radial communicating passageway in the shaft. These passageways are numbered 23 and 24, and upon rotation of the shaft form a centrifugal air pump. The air outlet is restricted to maintain a balance so that the pressure of the air remaining in the shaft and the gravity action on the liquid in the feed tube permits the building up of only the desired thickness of oil film on the inner wall of the shaft.

In the horizontal arrangement of shaft 4 as indicated in Figure 3, an air core within the rotating shaft is also maintained, due to the fact that air is pocketed in the shaft, as lubricant flowing therein through the filling opening 18 will stop at a level about on a line with the upper edge 19 of the filling aperture.

Then when the shaft is in rotation the lubricant is thrown outwardly into a cylinder against the inner wall of the shaft and cannot because of the air be forced by the centrifugal pressure outwardly along the threads of plug 20.

In the operation of any of the forms illustrated, the lubricant is under pressure due to the centrifugal force or other means, and its entrance into the bearings is limited by the plugs 5. These plugs have minute pores radial to the axis of rotation and which are too small to permit passage of the lubricant by capillary action. The feed of the lubricant may be so accurately controlled as to require several hours for a bearing to throw off enough lubricant to form a single drop.

The heating of the bearing due to excess lubrication may not be measurable at low speeds, but becomes a decided factor in high speed mechanism, and therefore it becomes important to provide a lubricator which is so effective in restricting the feed of lubricant that the lubricant cannot be transmitted by either capillary action or by gravity flow. The plugs 5 completely prohibit the passage of lubricant except when the lubricant is under sufficient pressure to be forced through the minute interstices occurring in the solid structure of the plug and extending radially inwards from the bearing. Many of the hard woods serve the purpose in the particular constructions illustrated. The plugs completely stop the passage of lubricant under ordinary conditions and when the lubricant is forced through the plug due to high pressure thereon it is delivered in an extremely attenuated mist. The action is not fairly comparable to wick arrangements where drops of lubricant may be thrown outward, or the lubricant would fairly pour through the wick if subjected to the very considerable centrifugal pressures developed by the high speed of the mechanism herein described.

Although but specific embodiments of this invention are herein shown and described, it will be understood that details of the constructions shown may be altered or omitted without departing from the invention as defined by the following claims:

I claim:

1. In a lubricator, a rotary construction having a passageway arranged for transmitting a lubricant under the centirfugal pressure developed by rotation of said construction, a porous solid element completely closing said passageway, said rotary construction being provided with a lubricant supply tube for communicating with a source of lubricant, and said supply tube having an outlet located in position to be sealed by a lubricant when the lubricant is under centrifugal pressure within said rotary construction.

2. In a lubricator, a rotary construction having a passageway arranged for transmitting a lubricant under the centrifugal pressure developed by rotation of said construction, a porous solid element completely closing said passageway, said rotary construction being provided with a lubricant supply tube for communicating with a source of lubricant, said supply tube having an outlet located in position to be sealed by a lubricant when the lubricant is under centrifugal pressure within said rotary construction, and said rotary construction being provided with an air ejecting passageway having an outlet spaced radially from its inlet.

3. A hollow shaft for rotation at high speeds forming therein a lubricant reservoir, an anti-friction bearing therearound, said shaft having an outlet aperture near but spaced from the said bearing, and a rigid closure member for said outlet aperture having a porous body of which the pores are minute to the point of defeating capillary attraction and function at high speeds only to discharge lubricant by centrifugal force in the form of a fine mist externally of the shaft.

4. A hollow shaft for rotation at high speeds forming therein a lubricant reservoir, an anti-friction bearing therearound, said shaft having an outlet aperture near but spaced from the said bearing, and a rigid tapering plug closing said outlet to the discharge of lubricant at low speeds, having pores therein, minute to the point of defeating capillary action, discharging lubricant in a fine mist solely by centrifugal action at high speeds.

5. A hollow shaft for rotation at high speeds, forming therein a lubricant reservoir, an antifriction bearing therearound, said shaft having a lateral outlet in close proximity to said bearing, and a closure plug interfitting said outlet for defeating capillary attraction and discharge of lubricant from the shaft at low speeds, said plug having its body of a porosity to discharge lubricant in the form of a fine mist solely by reason of the centrifugal action of high speed rotation of the shaft.

6. A hollow shaft for rotation at high speeds, forming therein a lubricant reservoir, an antifriction bearing therearound, said shaft having a lateral outlet in close proximity to said bearing, and a closure plug interfitting said outlet for defeating capillary attraction and discharge of lubricant from the shaft at low speeds, said plug having a rigid body of a porosity to discharge lubricant in the form of a fine mist under the sole influence of centrifugal force incident to high speed rotation of the shaft.

RUDOLPH F. ONSRUD.